(12) United States Patent
Happel et al.

(10) Patent No.: US 8,118,519 B2
(45) Date of Patent: Feb. 21, 2012

(54) GROUT AND LIFTING TUBE

(75) Inventors: Andrew J. Happel, Fort Wayne, IN (US); Chad E. Csadenyi, Fort Wayne, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 402 days.

(21) Appl. No.: 12/331,541

(22) Filed: Dec. 10, 2008

(65) Prior Publication Data

US 2009/0155000 A1 Jun. 18, 2009

Related U.S. Application Data

(60) Provisional application No. 61/013,717, filed on Dec. 14, 2007.

(51) Int. Cl.
*F16B 13/00* (2006.01)
(52) U.S. Cl. .......................................... 405/135; 411/71
(58) Field of Classification Search .................. 405/135; 411/55, 73
See application file for complete search history.

(56) References Cited

U.S. PATENT DOCUMENTS

| | | |
|---|---|---|
| 935,376 A | 9/1909 | Lennon |
| 3,124,385 A | 3/1964 | Neptune |
| 3,492,827 A | 2/1970 | Stevens |
| 3,557,563 A | 1/1971 | Stevens |
| 3,893,487 A | 7/1975 | Engelking |
| 4,103,498 A | 8/1978 | Steinborn et al. |
| 4,183,699 A | 1/1980 | Donan, Jr. et al. |
| 4,290,638 A | 9/1981 | Manning |
| 4,325,575 A | 4/1982 | Holt et al. |
| RE31,131 E | 1/1983 | Torbet et al. |
| 4,507,069 A | 3/1985 | Murray et al. |
| 4,557,649 A * | 12/1985 | Jeal .................................. 411/40 |
| 4,615,554 A | 10/1986 | Schilla et al. |
| 4,679,362 A | 7/1987 | Mess |
| 4,826,373 A | 5/1989 | Nakano |
| 4,905,429 A | 3/1990 | Fukushima et al. |
| 4,956,032 A | 9/1990 | Hahn et al. |
| 5,033,952 A | 7/1991 | Haug |
| 5,176,215 A | 1/1993 | Ackerman |
| 5,257,486 A | 11/1993 | Holmwall |
| 5,476,344 A | 12/1995 | Nordvall |

(Continued)

FOREIGN PATENT DOCUMENTS

CN 1730910 2/2006

(Continued)

*Primary Examiner* — Tara Mayo-Pinnock
(74) *Attorney, Agent, or Firm* — Faegre Baker Daniels LLP

(57) ABSTRACT

A grout and lifting tube for casting within a concrete segment. The tube provides enhanced sealing between the tube and the concrete to prevent moisture leakage into a structure formed by a plurality of the concrete segments. The tube includes a generally cylindrical body having an exterior with an anchoring rib structure, a threaded interior, a proximal end, a distal end. An annular gasket is disposed at the proximal end of the tube body, and may be secured to the proximal end of the tube body by a mechanical interlock and/or by unitary co-molding. After the concrete section is placed and grout is pumped through the tube, a plug is threadable into the proximal end of the tube to both compress the gasket between the plug and the tube at a first seal, and to compress the gasket between the plug and the concrete surrounding the proximal end of the tube at a second seal to provide robust, watertight sealing.

14 Claims, 5 Drawing Sheets

U.S. PATENT DOCUMENTS

| | | |
|---|---|---|
| 5,490,750 A | 2/1996 | Gundy |
| 5,641,256 A | 6/1997 | Gundy |
| 5,881,523 A | 3/1999 | Quatrochi, Jr. |
| 5,913,792 A | 6/1999 | Fischer |
| 6,694,680 B2 | 2/2004 | Zambelli et al. |
| 6,792,734 B2 | 9/2004 | Zambelli et al. |
| 6,821,056 B1 | 11/2004 | Mansour |
| 7,097,388 B1 | 8/2006 | Mansour et al. |
| 7,213,795 B2 | 5/2007 | Paterson |
| 7,308,970 B2 | 12/2007 | Holub |
| 2007/0090566 A1 | 4/2007 | Westhoff et al. |

FOREIGN PATENT DOCUMENTS

| | | |
|---|---|---|
| DE | 601 09 830 | 1/2006 |
| EP | 0 400 814 | 12/1990 |
| EP | 1 182 362 | 2/2002 |
| EP | 1 382 862 | 1/2004 |
| JP | 9-4378 | 1/1997 |
| JP | 2004-190341 | 7/2004 |

* cited by examiner

FIG_2

GROUT AND LIFTING TUBE

CROSS-REFERENCE TO RELATED APPLICATIONS

This application claims the benefit under Title 35, U.S.C. §119(e) of U.S. Provisional Patent Application Ser. No. 61/013,717, entitled GROUT AND LIFTING TUBE, filed on Dec. 14, 2007, the entire disclosure of which is expressly incorporated by reference herein.

BACKGROUND OF THE INVENTION

1. Field of the Invention

The present invention relates to grout and lifting tubes of the type used for moving and placing concrete sections.

2. Description of the Related Art

Grout and lifting tubes are often used in the tunnel industry, for example, for moving and placing the large concrete sections that form the walls of tunnels. In one system, one or more such tubes are cast into each concrete segment, and a lift member is threaded into each tube. The lift member is grasped by a crane or other device to move the concrete section into place, followed by removing the lift member from the tube. Thereafter, grout is pumped through a non-return valve in the tube to the outside of the concrete section, and the grout cures to seal the exterior of the tunnel. Finally, caps are threaded into the open ends of the tube to close same.

The tube typically includes one or more hydrophilic O-rings fitted about its exterior surface to provide a seal between the tube and the surrounding concrete in order to prevent moisture infiltration into the interior of the tunnel. A disadvantage of using O-rings is that same are expensive, particularly when a number of O-rings are needed for each tube, and when the tunnel may include hundreds or even thousands of concrete sections and tubes. It is also thought that such O-rings could potentially not provide sufficient sealing in applications where the O-rings may be subjected to high hydrostatic pressure, such as in deep underground tunnels or underwater tunnels.

What is needed is a grout and lifting tube that is an improvement over the foregoing.

SUMMARY OF THE INVENTION

The present invention provides a grout and lifting tube for casting within a concrete segment. The tube provides enhanced sealing between the tube and the concrete to prevent moisture leakage into a structure formed by a plurality of the concrete segments. The tube includes a generally cylindrical body having an exterior with an anchoring rib structure, a threaded interior, a proximal end, a distal end. An annular gasket is disposed at the proximal end of the tube body, and may be secured to the proximal end of the tube body by a mechanical interlock and/or by unitary co-molding. After the concrete section is placed and grout is pumped through the tube, a plug is threadable into the proximal end of the tube to both compress the gasket between the plug and the tube at a first seal, and to compress the gasket between the plug and the concrete surrounding the proximal end of the tube at a second seal to provide robust, watertight sealing.

In one form thereof, the present invention provides a grout and lifting tube assembly, including a tube having a generally cylindrical body defining perpendicular axial and radial directions, the body including an interior thread, a proximal end, and a distal end; a gasket at the proximal end of the body; and a plug including an exterior thread and a radial flange, the plug threadable into the proximal end of the tube whereby the gasket is compressible between the radial flange of the plug and the proximal end of the body.

In another form thereof, the present invention provides, in combination, a concrete segment; and a grout and lifting tube cast into the concrete segment, the tube including a generally cylindrical body defining perpendicular axial and radial directions, the body including an interior thread, a proximal end, and a distal end; a gasket at the proximal end of the body, the gasket extending in the radial direction beyond the proximal end of the body; and a plug including an exterior thread and a radial flange, the radial flange extending in the radial direction beyond the proximal end of the body, the plug threadable into the proximal end of the tube to compress a first portion of the gasket between the radial flange of the plug and the proximal end of the body to provide a first seal, and to compress a second portion of the gasket between the radial flange of the plug and the concrete segment to provide a second seal spaced radially outwardly of the first seal.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention any manner.

DETAILED DESCRIPTION

Figure 1:
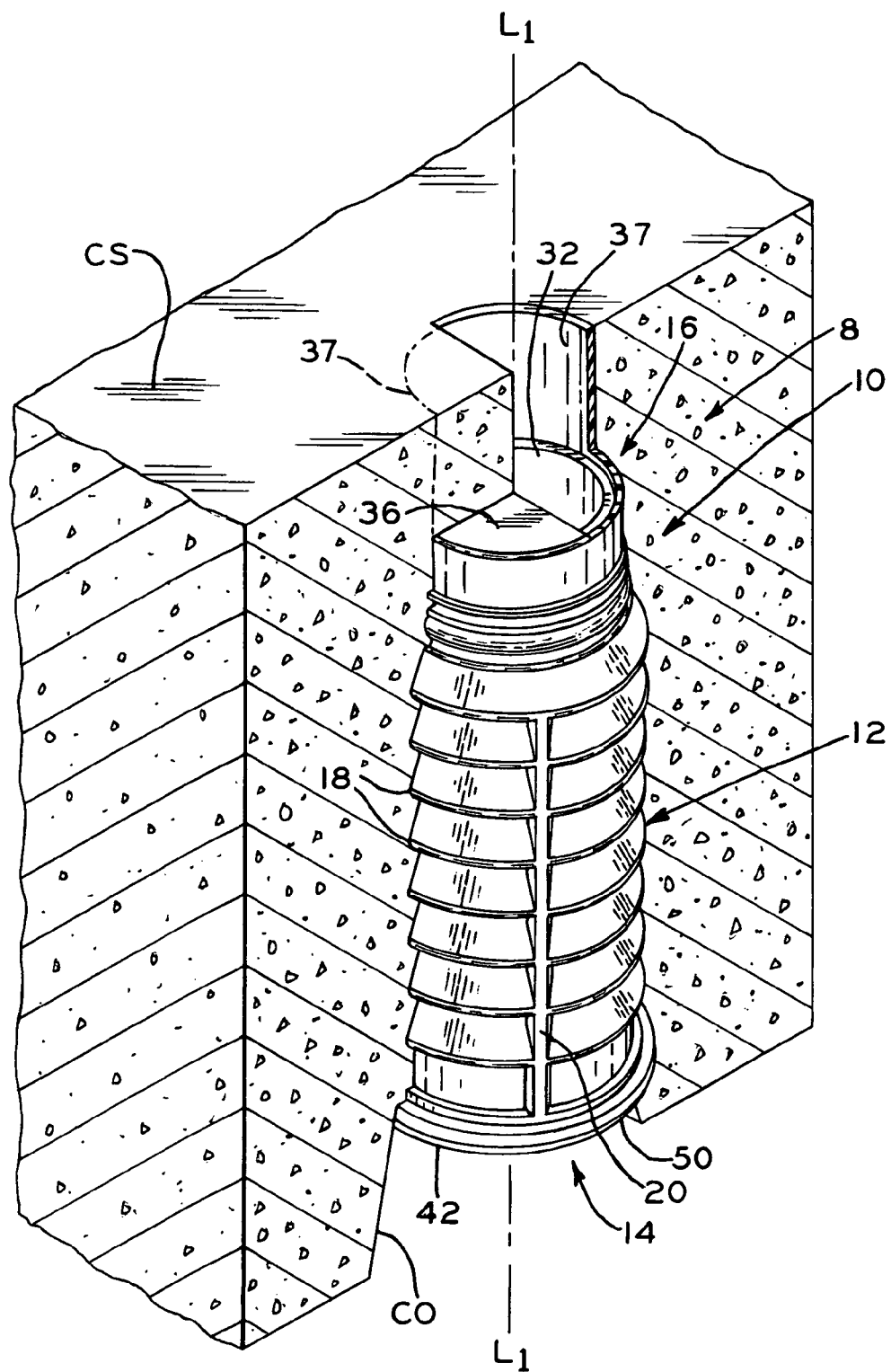
FIG. 1 is a partial sectional view through a concrete segment, showing a grout and lifting tube in accordance with the present invention.

Referring to FIGS. 1-4, a grout and lifting tube assembly 8 including grout and lifting tube 10 in accordance with the present invention is shown. Tube 10 includes a generally cylindrical body 12 having an exterior and an interior, together with a proximal end 14 and a distal end 16. Tube 10 may be formed of a suitable rigid plastic material, such as polypropylene, by an injection molding process, for example.

The exterior of tube body 12 includes an anchoring structure for anchoring tube 10 within cast concrete in the manner described below, including a plurality of annular radial ribs 18 that are perpendicular to, and spaced along, the longitudinal axis $L_1$-$L_1$ of tube body 12, together with three or more longitudinal ribs 20 extending along longitudinal axis $L_1$-$L_1$ of tube body 12, and which are radially spaced around tube body 12. The exterior anchoring structure of tube body 12 and other features of its exterior geometry are similar to that of the concrete anchoring members disclosed in U.S. Pat. Nos. 5,490,750 and 5,641,256, each assigned to the assignee of the present invention, the disclosures of which are expressly incorporated herein by reference.

The interior of tube body 12 includes an interior thread 22, and tube body 12 includes an annular radial flange 24 having a radially-extending surface perpendicular to longitudinal axis $L_1$-$L_1$ and surrounding opening 26 at proximal end 14 of tube body 12. Flange 24 includes an annular, axially-facing projection 28, best shown in FIG. 4, which is parallel to longitudinal axis $L_1$-$L_1$, the formation and operation of which is described below.

Distal end 16 of tube body 12 includes a tubular section 30 with opening 32, together with one or more exterior flanges that form one or more O-ring grooves 34 in which O-rings 35 may optionally be placed to provide a seal between distal end 16 of tube 10 and the surrounding concrete in which tube 10 is cast.

Cap 36, shown in solid lines to the left in FIGS. 1 and 2, may be formed of a suitable plastic material, and is fitted over tubular section 30 of distal end 16 of tube body 12 to enclose opening 32 when tube 10 is cast in concrete, as described below.

Gasket 38 may be secured to proximal end 14 of tube body 12 in the manner described below. Gasket 38 may be generally annular in shape, and is made of a relatively resilient, compressible material as compared to tube body 12, such as thermoplastic elastomer or a rubber material, for example.

Figure 4:
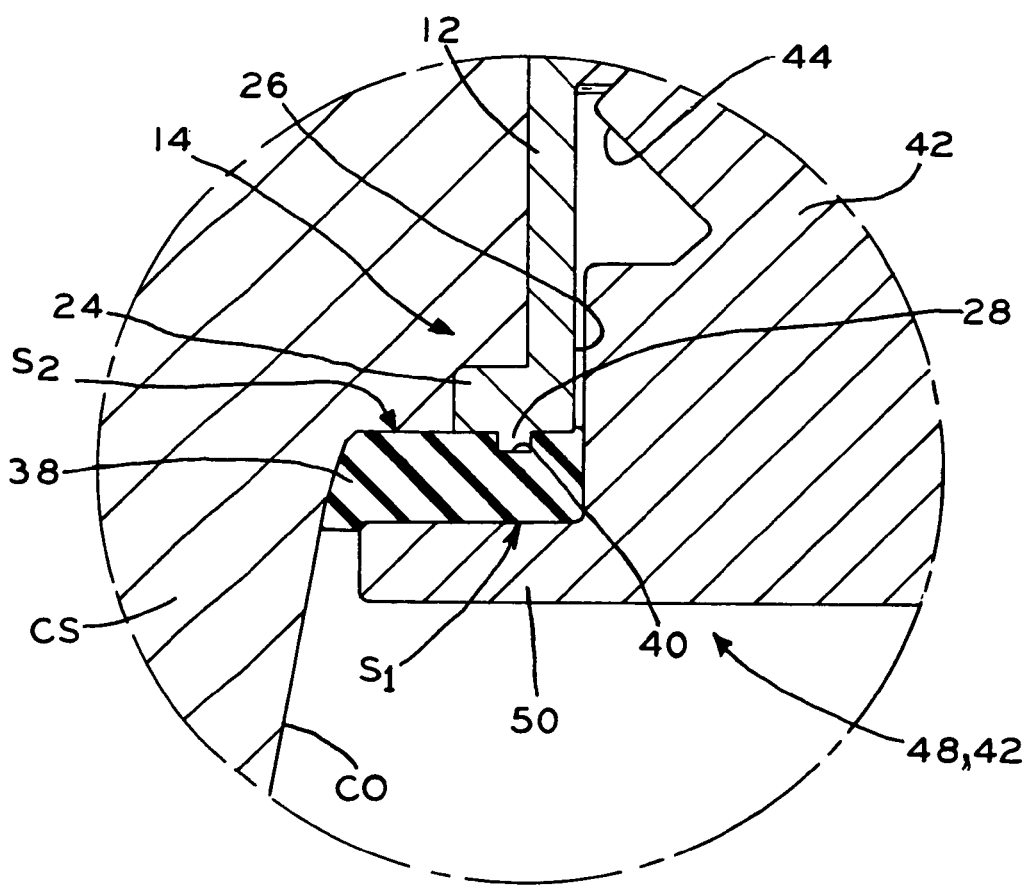
FIG. 4 is a fragmentary view of a portion of FIG. 3.
Figure 5:
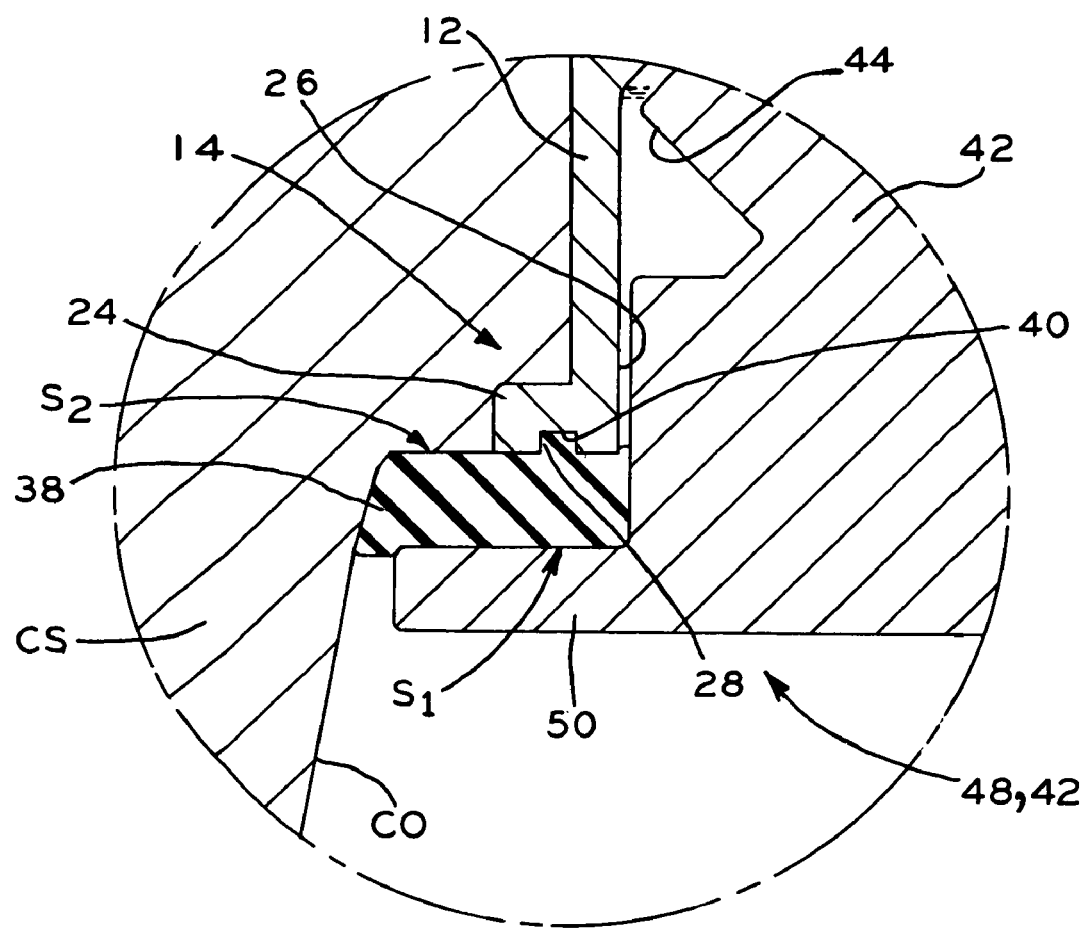
FIG. 5 is another fragmentary view of a portion of FIG. 3 according to an alternate embodiment.

In manufacturing tube 10, gasket 38 may first be molded to include an axially-facing annular groove 40, best shown in FIG. 4, followed by placing gasket 38 within the mold for tube body 12. Thereafter, the material of tube body 12 is injected into the mold, with some of the material that forms annular flange 24 entering groove 40 of gasket 38 to thereby form annular projection 28 of tube body 12 which provides a locking mechanical interconnection between gasket 36 and tube body 12. Alternatively, as shown in FIG. 5, this arrangement may be reversed, i.e., gasket 38 may include projection 28 for locking within a corresponding groove 40 in flange 24 of tube body 12.

Additionally, if the material of gasket 38 is not fully cured prior to molding tube body 12, a rigid chemical bond may be formed between gasket 38 and tube body 12 upon full curing of their respective materials such that the foregoing components are unitarily co-molded to one another. This co-molding of gasket 38 to tube body 12 is similar to the co-molding of the relatively rigid body to the relatively resilient sealing portion of the cast-in type gasket disclosed in U.S. patent application Ser. No. 11/220,229, published as U.S. Patent Application Publication No. 2006/0049627, assigned to the assignee of the present invention, the disclosure of which is expressly incorporated herein by reference.

Plug 42 is formed of metal or a rigid plastic material, and is generally cylindrically shaped, including an exterior thread 44 threadable within the interior thread 22 of tube body 12. Plug 42 includes a septum 46 separating its interior into two sections and, at its proximal end 48, includes an annular radial flange 50 having a radially-extending surface, the function of which is described below.

In use, tube 10 is cast within a concrete segment in the following manner. First, cap 36 is fitted, such as with a friction fit, onto distal end 16 of tube body 12 to close opening 32, and a suitable casting plug (not shown) is threaded into proximal end 14 of tube body 12 to enclose opening 26. The casting plug includes a cone-like structure (not shown) disposed exteriorly of tube body 12. Thereafter, concrete is cast around tube 10 and cures to form the concrete segment CS. As shown in FIGS. 1-3, a portion of the cast concrete extends over distal end 16 of tube body 12. Removal of the casting plug results in a conical-shaped opening CO in the concrete segment CS, as shown toward the bottom of FIGS. 1-3.

Figure 2:
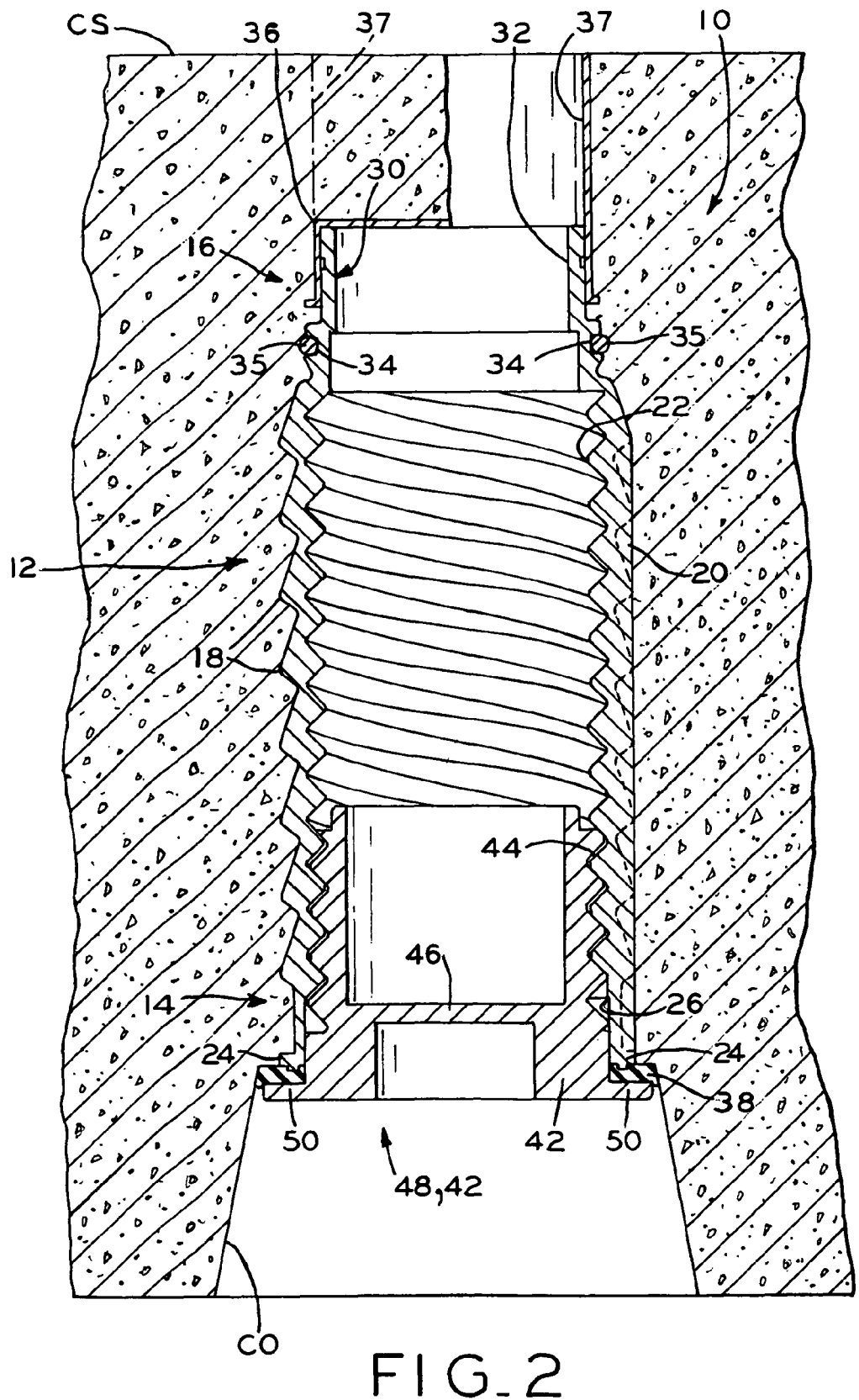
FIG. 2 is a sectional view through the concrete segment and the grout and lifting tube.
Figure 3:
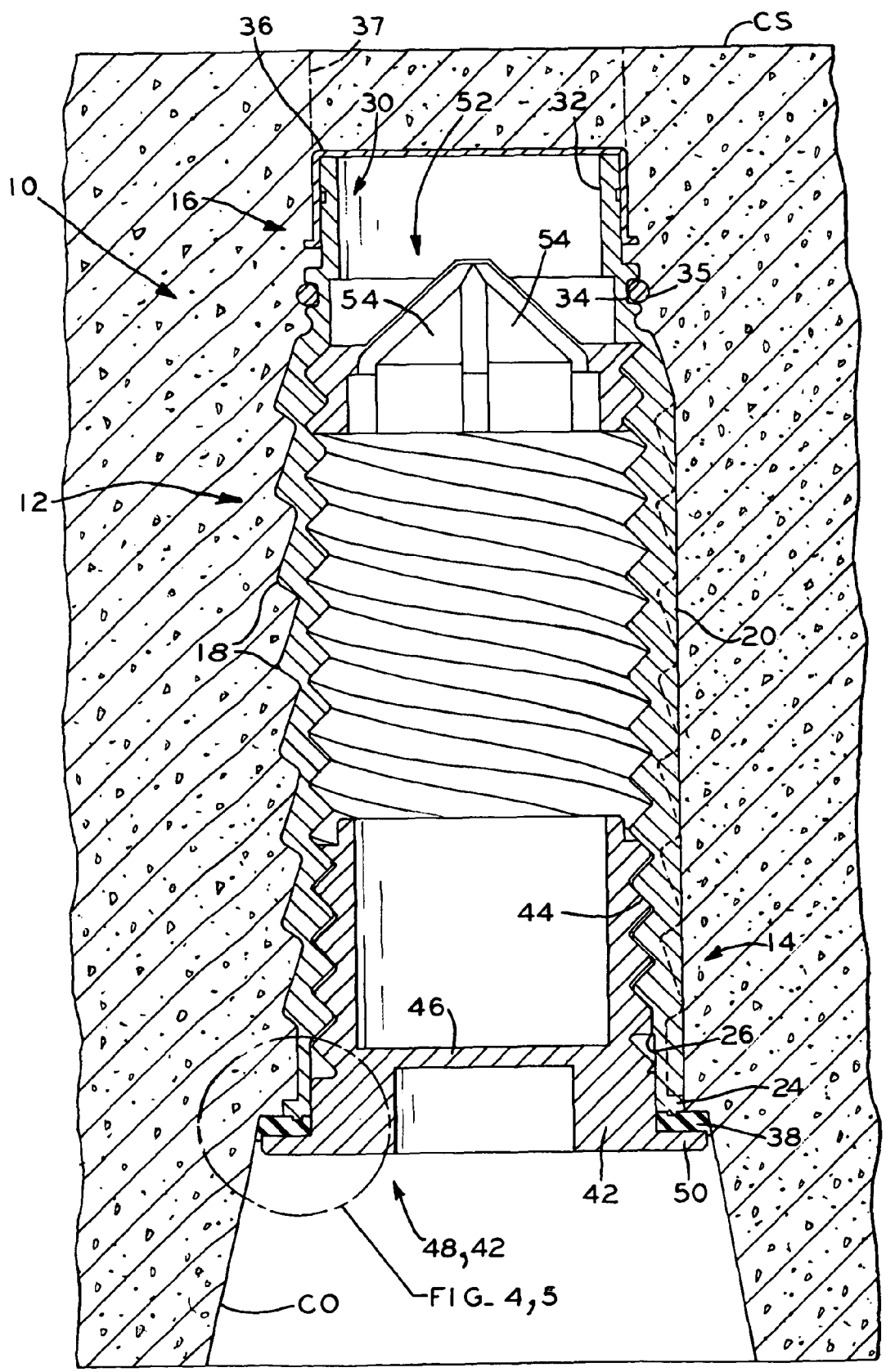
FIG. 3 is a sectional view through the concrete segment and the grout and lifting tube, further showing a non-return valve disposed within the grout and lifting tube.

Alternatively, as shown to the right in FIGS. 1 and 2, instead of using cap 36, a tubular extension member 37 may be fitted over distal end 16 of tube body 12 in the same manner in which cap 36 is attached thereto. The length of tubular extension member 37 is sufficient such that, after the concrete is cast, the tubular extension member 37 forms a corresponding opening that extends completely through the concrete segment CS for pumping grout through tube 10 to the rear side of concrete segment CS in the manner described below.

After concrete segment CS is cast, a lifting plug (not shown) may be threaded into proximal end 14 of tube body 12, which lifting plug includes an eye-bolt or other structure by which a crane or other device may grasp the lifting plug to move the concrete segment CS to a desired location, such as within the wall of a tunnel, for example. After the concrete segment CS is set in place and attached to surrounding concrete segments in a desired manner, the lifting plug is removed from tube body 12.

Thereafter, in embodiments in which cap 36 is used, a bore is drilled from proximal end 14 of tube body 12 through cap 34 and thence through the portion of concrete which overlies distal end 16 of tube body 12 and cap 36. This bore will correspond to the opening that may optionally be formed by extension member 37, discussed above. A non-return valve 52, shown in FIG. 3, having an external thread, is threaded into tube body 12 from the proximal end 14 thereof, and is seated toward the distal end 16 of tube body. Non-return or one-way valve 52 is a cone-type valve, including a number of flaps 54 that allow grout to flow into proximal end 14 of tube body 12 and outwardly of distal end 16 of tube body 12, but prevent backflow of grout in the opposite direction. Grout is then pumped through tube body 12 and non-return valve 52 to the opposite side of concrete segment CS to seal concrete segment CS to the exterior of the tunnel and/or to surrounding concrete segments.

After the grout has been pumped, plug 42 is threaded into proximal end 14 of tube body 12. As shown in FIG. 4, toward completion of the threading of plug 42 into tube body 12, radial annular flange 50 of plug 42 compresses a first, radially inner portion of gasket 38 between flange 50 of plug 42 and flange 24 at proximal end 14 of tube body 12 to form a first compressive seal $S_1$. Additionally, due to the radial extent of the width of flange 50 of plug 42 beyond the radial extent of the width of flange 24 of tube body 12, as shown in FIG. 4, flange 50 of plug 40 also compresses a second, radially outer portion of gasket 38 between flange 50 and the concrete which surrounds proximal end 16 of tube body 12 to form a second compressive seal $S_2$. These first and second compressive seals $S_1$ and $S_2$ together provide robust, watertight sealing between tube 10 and the concrete to prevent moisture leakage into the structure formed by a plurality of concrete segments CS.

If desired, additional concrete may be filled into the conical space in concrete segment CS adjacent plug 42 to provide a smooth interior surface on concrete segment CS and thence the interior of the structure formed by a plurality of concrete segments CS, such as a tunnel, for example.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A grout and lifting tube assembly, comprising:

a tube having a generally cylindrical body defining perpendicular axial and radial directions, said body including an interior thread, a proximal end, and a distal end, said proximal end of said body extending outwardly in the radial direction to a radial extent;

a gasket at said proximal end of said body, said gasket extending outwardly in the radial direction beyond said radial extent of said proximal end of said body; and a plug including an exterior thread and a radial flange, said radial flange extending outwardly in the radial direction beyond said radial extent of said proximal end of said body, said plug threadable into said proximal end of said tube whereby said gasket is compressible between said radial flange of said plug and said proximal end of said body.

2. The grout and lifting tube assembly of claim 1, wherein at least one of said tube body and said gasket includes an annular projection, and the other of said tube body and said gasket includes an annular recess, said projection engaging within said recess to mechanically interconnect said tube body and said gasket.

3. The grout and lifting tube assembly of claim 1, wherein said tube body is made of a rigid material and said gasket is made of a resilient material, said gasket unitarily bonded to said proximal end of said tube body by co-molding said tube body and said gasket.

4. The grout and lifting tube assembly of claim 1, wherein said tube body includes at least one of a plurality of external, radially-extending ribs spaced from one another along said tube body in said longitudinal direction; and a plurality of external, longitudinally-extending ribs spaced from one another radially around said tube body.

5. The grout and lifting tube assembly of claim 1, further comprising a cap member fittable to said distal end of said tube body to close said distal end.

6. The grout and lifting tube assembly of claim 1, further comprising a one-way valve having an external thread, said valve threadable into said tube body.

7. The grout and lifting tube assembly of claim 1, wherein said proximal end of said tube body includes a radially extending flange, said gasket fitted to said flange of said tube body.

8. In combination:

a concrete segment; and a grout and lifting tube cast into said concrete segment, said tube comprising:

a generally cylindrical body defining perpendicular axial and radial directions, said body including an interior thread, a proximal end, and a distal end, said proximal end of said body extending outwardly in the radial direction to a radial extent;

a gasket at said proximal end of said body, said gasket extending in the radial direction beyond said radial extent of said proximal end of said body; and a plug including an exterior thread and a radial flange, said radial flange extending outwardly in the radial direction beyond said radial extent of said proximal end of said body, said plug threadable into said proximal end of said tube to compress a first portion of said gasket between said radial flange of said plug and said proximal end of said body to provide a first seal, and to compress a second portion of said gasket between said radial flange of said plug and said concrete segment to provide a second seal spaced radially outwardly of said first seal.

9. The combination of claim 8, wherein said tube is anchored within said concrete segment by at least one of:

a plurality of external, radially-extending ribs spaced from one another along said tube body in said longitudinal direction; and a plurality of external, longitudinally-extending ribs spaced from one another radially around said tube body.

10. The combination of claim 8, wherein at least one of said tube body and said gasket includes an annular projection, and the other of said tube body and said gasket includes an annular recess, said projection engaging within said recess to mechanically interconnect said tube body and said gasket.

11. The combination of claim 8, wherein said tube body is made of a rigid material and said gasket is made of a resilient material, said gasket unitarily bonded to said proximal end of said tube body by co-molding said tube body and said gasket.

12. The combination of claim 8, further comprising a cap member fitted to said distal end of said tube body to close said distal end.

13. The combination of claim 8, further comprising a one-way valve having an external thread, said valve threadable into said tube body.

14. The combination of claim 8, wherein said proximal end of said tube body includes a radially extending flange, said gasket fitted to said flange of said tube body.

* * * * *